United States Patent

[11] 3,625,874

[72] Inventors: Kirkwood S. Cottman, Akron; William S. Hollingshead, Cuyahoga Falls; Ronald B. Spacht, Hudson, all of Ohio
[21] Appl. No.: 706,656
[22] Filed: Feb. 19, 1968
[45] Patented: Dec. 7, 1971
[73] Assignee: The Goodyear Tire & Rubber Company, Akron, Ohio

[54] PHENOL-CYCLIC POLYOLEFIN REACTION PRODUCTS AS STABILIZERS FOR POLYMERS
6 Claims, No Drawings

[52] U.S. Cl. .................................. 260/5, 260/29.6 R, 260/29.7 R, 260/33.6 A, 260/62, 260/859 R, 260/887, 260/888, 260/889, 260/893, 260/894, 260/897 B
[51] Int. Cl. .................................. C08g 33/10, C08g 49/04
[50] Field of Search .................................. 260/62, 5

[56] References Cited

UNITED STATES PATENTS

| | | | |
|---|---|---|---|
| 2,801,981 | 8/1957 | Spacht | 260/62 |
| 2,852,568 | 9/1958 | Schmerling | 260/62 |
| 2,864,868 | 12/1958 | Bader | 260/62 |
| 2,952,662 | 9/1960 | Wald | 260/62 |
| 3,124,555 | 3/1964 | Bown et al. | 260/62 |
| 3,383,362 | 5/1968 | Gonzenbach | 260/62 |
| 3,431,310 | 3/1969 | Davis et al. | 260/62 |

FOREIGN PATENTS

| | | | |
|---|---|---|---|
| 1,474,754 | 2/1967 | France | 260/62 |
| 691,043 | 5/1953 | Great Britain | 260/62 |

*Primary Examiner*—Samuel H. Blech
*Attorneys*—F. W. Brunner and J. A. Rozmajzl

ABSTRACT: Reaction products of monocyclic and bicyclic diolefins with phenols as age resistors for polymers.

PHENOL-CYCLIC POLYOLEFIN REACTION PRODUCTS AS STABILIZERS FOR POLYMERS

This invention relates to age resistors for oxidizable organic materials, their preparation and use in the stabilization of polymers which normally tend to deteriorate when exposed to normal atmospheric conditions and in particular when exposed to sunlight and/or elevated temperature in the presence of air or oxygen.

Polymers have proven to be some of the most difficult organic materials to successfully stabilize against the deleterious effects of oxygen and ozone, particularly rubbery polymers, both natural and synthetic. Both vulcanized and unvulcanized polymers are susceptible to the deleterious effects that are found in normal atmospheric conditions, and although many materials have been suggested and used as polymer stabilizers no completely satisfactory material has been found that will fully protect these polymers under the widely different conditions to which they are subjected. The search for new and better polymer stabilizers is therefore a problem which continues to command the attention of many skilled investigators.

Phenolic compounds have been among the more commonly used compounds that have found wide scale acceptance as polymer stabilizers. But many of the phenolic antioxidants, although reasonably effective stabilizers for organic materials, tend to impart discoloration and staining to the materials they are intended to stabilize. An additional problem that is not successfully solved by many of the previously known phenolic stabilizers is that they are in varying degrees too readily volatilized, and therefore escape from the materials which they are intended to stabilize during the rather extended service life to which such materials are subjected.

It is therefore an object of this invention to provide a new class of phenolic antioxidants which can be used as stabilizers for organic compounds and which stabilizers are relatively nondiscoloring and nonvolatile in polymers.

In accordance with the present invention it has been found that the foregoing and additional objectives can be accomplished by employing as stabilizers for polymeric materials which are subject to the deleterious effects of oxygen, ozone and sunlight, reaction products of a phenol and specific types of diolefins. The reaction products may be subsequently alkylated with a tertiary olefin if desired. The latter method will be referred to herein as the two step method wherein the former method will be referred to as the one step method.

In the one step method the reaction product is prepared by reacting a mixture comprising (A) at least one phenol conforming to the following structural formula:

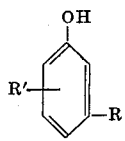

wherein R is selected from the group consisting of hydrogen, alkyl radicals having from one to 12 carbon atoms, cycloalkyl radicals having from five to 12 carbon atoms, aralkyl radicals having from seven to 12 carbon atoms, alkoxy radicals having from one to 12 carbon atoms, cycloalkoxy radicals having from five to 12 carbon atoms and aralkoxy radicals having from seven to 12 carbon atoms and R' is selected from the group consisting of hydrogen and tertiary alkyl radicals having from four to 12 carbon atoms, and (B) at least one diolefin selected from the group consisting of (a) a monocyclic unsaturated hydrocarbon having from seven to 16 carbon atoms within the ring structure, having from two to three nonadjacent carbon to carbon double bonds within the ring structure and having from zero to three alkyl substituents, each alkyl substituent having from one to four carbon atoms and (b) a bicyclic unsaturated hydrocarbon having from five to 12 carbon atoms within the ring structure having two carbon to carbon double bonds within the ring structure and having from zero to three alkyl substituents, each alkyl substituent having from one to four carbon atoms.

Preferably R' is in a position ortho to the hydroxy group. Most preferably R' is a tertiary alkyl radical having four to six carbon atoms and located in a position ortho to the hydroxy group.

In the two step method the reaction product is prepared by (1) reacting a mixture comprising (A) at least one phenol conforming to the following structural formula:

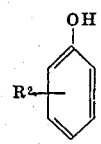

wherein $R^2$ is selected from the group consisting of hydrogen, alkyl radicals having from one to 12 carbon atoms, cycloalkyl radicals having from five to 12 carbon atoms, aralkyl radicals having from seven to 12 carbon atoms, alkoxy radicals having from one to 12 carbon atoms, cycloalkoxy radicals having from five to 12 carbon atoms and aralkoxy radicals having from seven to 12 carbon atoms and (B) at least one diolefin selected from the group consisting of (a) a monocyclic unsaturated hydrocarbon having from seven to 16 carbon atoms within the ring structure, having from two to three nonadjacent carbon to carbon double bonds within the ring structure and having from zero to three alkyl substituents, each alkyl substituent having from one to four carbon atoms and (b) a bicyclic unsaturated hydrocarbon having from five to 12 carbon atoms within the ring structure having two carbon to carbon double bonds within the ring structure and having from zero to three alkyl substituents, each alkyl substituent having from one to four carbon atoms and (2) subsequently reacting the product of the first step with at least one tertiary olefin having from four to 12 carbon atoms. Preferably the olefin is a tertiary olefin having from four to six carbon atoms.

Where it is desired that the final produce possess alkoxy, cycloalkoxy or aralkoxy substituents, the one step process is preferred. Otherwise the two step process is preferred.

Illustrative species of phenols which may be used in the one step process are listed below.
2-tert.butyl-4-methyl phenol
2-tert.butyl-2-methyl phenol
6-tert.butyl-3-methyl phenol
2,6-ditert.butyl phenol
2-tert.butyl-4-methoxy phenol
2-tert.butyl-6-methoxy phenol
2-tert.butyl phenol
2-tert.hexyl-4-methyl phenol
2-tert.octyl-4-methyl phenol
2-tert.dodecyl-4-methyl phenol
2-tert.hexyl-4-methoxy phenol Illustrative species of phenols which may be used in the two step process are listed below.
phenol
o, m,p-cresol
o,m,p-isopropyl phenol
o,m,p-propyl phenol
o,m,p-ethyl phenol
o,m,p-methoxy phenol
o,m,p-ethoxy phenol
o,m,p-propoxy phenol
p-butyl phenol
p-hexyl phenol
p-octyl phenol
p-dodecyl phenol Illustrative species of monocyclic diolefins which may be used in the practice of the present invention are listed below.
1,4-cycloheptadiene
2-methyl-cycloheptadiene-1,4
4-methyl-cycloheptadiene-1,4
1,3-dimethyl-cycloheptadiene-1,4

1,5-dimethyl-cycloheptadiene-1,4
1,3-cycloheptadiene
1-methyl-cycloheptadiene-1,3
3-methyl-cycloheptadiene-1,3
1,4-dimethyl-cycloheptadiene-1,3
1,3-cyclooctadiene
3-methyl-cyclooctadiene-1,3
1,3-dimethyl-cyclooctadiene-1,3
1,4-cyclooctadiene
5-methyl-cyclooctadiene-1,4
1,5-dimethyl-cyclooctadiene-1,4
1,5-cyclooctadiene
3-methyl-cyclooctadiene-1,5
1,4-dimethyl-cyclooctadiene-1,5
1,5-cyclododecadiene
1,7-cyclododecadiene
1,5,9-cyclododecatriene Illustrative species of bicyclic diolefins which may be used in the practice of the present invention are listed below.

bicyclo[2.2.1]-2,5-heptadiene
2-methyl bicyclo[2.2.1]-2,5-heptadiene
3-methyl bicyclo[2.2.1]-2,5-heptadiene
4-methyl bicyclo[2.2.1]-2,5-heptadiene
2,4-dimethyl bicyclo[2.2.1]-2,5-heptadiene
bicyclo[3.4.0]nonadiene-2,7
bicyclo[3.4.0]-7-methyl nonadiene-2,7
bicyclo[3.4.0]-8-methylnonadiene-2,7
bicyclo[3.4.0]-6-methyl-nonadiene-2,7
bicyclo[3.4.0]-9-methyl-nonadiene-2,7
bicyclo[3.4.0]-3,8-dimethyl nonadiene-2,7
bicyclo[3.4.0]-3,7-dimethyl nonadiene-2,7
bicyclo[2.4.0]octadiene-2,6
bicyclo[2.4.0]-5-methyl octadiene-2,6
bicyclo[2.4.0]-6-methyl octadiene-2,6
bicyclo[2.4.0]-7-methyl octadiene-2,6
bicyclo[2.4.0]-5,7-dimethyl octadiene-2,6
spiro[4.4]nonadiene-2,6
spiro[4.4]-6-methyl nonadiene-2,6
spiro[4.4]-6-methyl nonadiene-2,6
spiro[4.4]-3,7-dimethyl nonadiene-2,6
spiro[4.4]-2,6-dimethyl nonadiene-2,6
bicyclo[3.3.0]octadiene-2,6
bicyclo[3.3.0]-6-methyl octadiene-2,6
bicyclo[3.3.0]-7-methyl octadiene-2,6
bicyclo[3.3.0]-2,5-dimethyl octadiene-2,6
bicyclo[3.3.0]-2,6-dimethyl octadiene-2,6

Illustrative species of tertiary olefins that may be used in the two step process are listed below.

isobutylene
2-methyl-1-butene
2-methyl-1-pentene
2-methyl-2-pentene
2-methyl-1-hexene
2-methyl-2-hexene
diisobutylene Preferred monocyclic diolefins are cyclooctadienes and alkylated cyclooctadiene.

Preferred bicyclic diolefins are diolefins conforming to the following structural formulas.

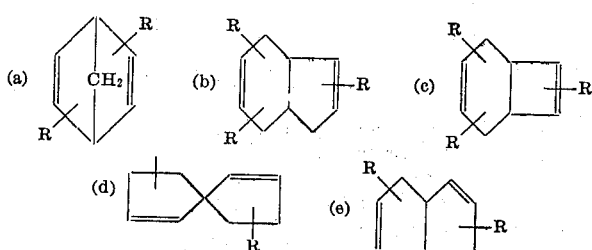

wherein R is selected from the group consisting of hydrogen and alkyl radicals containing one to four carbon atoms. The R's may be the same or different.

The most preferred bicyclic diolefins are the diolefins conforming to (a) above, i.e., bicyclo[2.2.1]-2,5-heptadiene both alkylated and unsubstituted.

The reaction between the diolefin and the phenolic compounds is effectively catalyzed by a Friedel-Craft type catalyst, and in particular the more potent Friedel-Craft catalysts such as aluminum chloride, zinc chloride, ferrous and ferric chloride and boron trifluoride, as well as complexes based on boron trifluoride. Boron trifluoride and complexes based on boron trifluoride are preferred catalysts for the one step process and the first step of the two step process. The second step of the above described two step reaction process, wherein the product obtained by reacting the olefin and a phenolic compound is further alkylated with a tertiary olefin, is effectively catalyzed by employing one or more of the customary acidic alkylation catalysts such as sulfuric acid, benzene sulfonic acid, toluene sulfonic acid, acid activated clays, boron trifluoride, zinc chloride, ferrous and ferric halides, aluminum halides and the stannous and stannic halides. Sulfuric acid, benzene sulfonic acid, toluene sulfonic acid and acid activated clay are preferred catalysts for the second step of the two step process. The catalysts employed in both the first and second stages of the two step process and in the one step process are employed in the customary catalytic amounts, which will normally vary from 0.1 percent to 5.0 percent of catalyst based on the total weight of the reactants in the reaction which is to be catalyzed.

While boron trifluoride will function as an alkylation catalyst to catalyze the second step of the two step process it is not a particularly desirable alkylation catalyst since it tends to promote undesirable side reactions. It is therefore preferred to remove the boron trifluoride catalyst when it is employed in the first step of the reaction before proceeding with the second or alkylation step of the two step process. The boron trifluoride catalyst may be effectively removed by destroying it with a basic material such as ammonia, or a solution of sodium hydroxide or sodium carbonate. Alternatively the boron trifluoride catalyst may be removed along with excess phenolic materials by heating the reaction mixture to a temperature from 100° to 160° C. under vacuum. An additional method of removing the boron trifluoride catalyst employed in the first step of the two step process and in the one step process is by refluxing the reaction mixture from step one with a small quantity of an inert organic solvent such as toluene at a temperature between 150° and 160° C. In either of the latter two methods the boron trifluoride may be recovered and subsequently reused in catalyzing the reaction between the phenol and diolefin. The acidic alkylation catalyst employed to catalyze the second step of the two step process is normally neutralized with a suitable basic material such as a sodium carbonate solution.

The reaction between the phenol and diolefin in either process is conducted at a temperature from 25° to 160° C. Preferred reaction temperatures are between 80° and 150° C. The reaction between the diolefin and a phenolic compound may be started at room temperature and since the reaction is rapid and exothermic the heat of reaction may be used to obtain the final reaction temperature. If adequate cooling facilities are available the reaction may be carried out on a continuous basis.

The molar ratio of the diolefin to the phenolic compound reactants may vary from 1:10 to 10:1. A preferred molar ratio of diolefin to phenolic compound is from 3:1 to 1:5. When the ratio exceeds 3:1, the one step process is normally preferred. In some instances it may be desirable to carry out the one step process and the first step of the two step process in an inert organic solvent such as benzene or toluene. The employment of a solvent is particularly desirable if a relatively low-ratio of phenolic compound to diolefin is used. When the molar ratio of phenolic compound to diolefin is 3:1 or higher, the excess phenolic compound acts as an effective solvent and no additional solvent need be employed.

The one step process and the first step of the two step process may be carried out by adding the diolefin to the mixture of phenolic compound and catalyst or the catalyst may be added gradually to the mixture of phenolic compound and diolefin. The first of these two procedures is preferred. The rate at which the reactants are combined can vary over a wide range as long as the temperature is kept below 160° C.

The second step of the two step process involves alkylation of the product obtained in step one. In carrying out the second step of the process the resinous product obtained from step one is dissolved in an equal quantity of an inert hydrocarbon solvent such as benzene, toluene, etc. Alkylation is normally conducted at a temperature between 20° and 100° C. A preferred temperature range is between 60° and 80° C. If the tertiary olefin which is employed as an alkylation agent is a gas it may be added to the reaction under pressure but the pressures should not exceed 30 p.s.i. if excessive polymerization is to be avoided. In step two of the process it is also preferable to carry out the alkylation as rapidly as possible, however the time within which the reaction is completed in dependent upon the activity of the alkylating agent used.

The amount of olefin used in the second step will depend upon the number of reactive sites available on the phenolic moiety of the product of the first step. The number of available sites will be dependent on such factors as the diolefin and phenolic compound used, the ratio of diolefin to the phenolic compound and the number of substituents on the phenolic reactant. Normally the olefin is reacted with the product of the first step until no further reaction occurs, although less olefin may be used.

The compounds of this invention are useful in protecting polymer in any form, e.g. polymer in latex form, unvulcanized polymer and vulcanized polymer. The method of addition of the antioxidant to the polymer is not critical. They may be added by any of the conventional means such as by adding to a polymer latex, milling on an open mill or by internal mixing. They are highly efficient and are capable of being employed in relatively small amounts to effectively stabilize the polymers into which they are incorporated. Normally 0.001 to 5.0 percent of the antioxidant by weight based on the weight of the polymer can be used, although the precise amount of these highly effective stabilizers which is to be employed will depend somewhat on the nature of the polymer and the severity of the deteriorating conditions to which the polymer is to be exposed. In unsaturated polymers such as those made from conjugated dienes, the amount of antioxidant necessary is greater than that required by a saturated polymer such as polyethylene. It has been found that an effective antioxidant amount of the disclosed stabilizers in rubbery polymers will generally range from 0.05 to 5.0 percent by weight based on the weight of the polymer although it is commonly preferred to use from 0.5 to 2.0 percent by weight based on the weight of the polymer.

The polymers that may be conveniently protected by the phenolic compounds in accordance with this invention are vulcanized and unvulcanized oxidizable rubber and those synthetic oxidizable polymers which are normally susceptible to deterioration by sunlight and atmospheric oxygen such as prepared from conjugated dienes as well as the synthetic polymers and copolymers prepared from monoolefins. Representative examples of the synthetic polymers used in the practice of this invention are polychloroprene; homopolymers of a conjugated 1,3-diene such as isoprene and butadiene and in particular, polyisoprenes and polybutadienes having essentially all of their repeat units combined in a cis-1,4 structure; copolymers of a conjugated 1,3 diene such as isoprene and butadiene with up to 50 percent by weight of the polymer of at least one copolymerizable monomer such as styrene and acrylonitrile; butyl rubber, which is a polymerization product of a major proportion of a monoolefin and a minor proportion of a multiolefin such as butadiene or isoprene; polymers and copolymers of monoolefins containing little or no unsaturation, such as polyethylene, polypropylene, ethylene propylene copolymers and terpolymers of ethylene, propylene and a nonconjugated diene; and polyurethanes containing carbon to carbon double bonds.

The practice of this invention is found particularly beneficial when applied to the stabilization of homopolymers of a conjugated 1,3-diene such as isoprene and butadiene and copolymers of said diene with up to 50 percent by weight of at least one copolymerizable monomer such as styrene and acrylonitrile.

The stabilizers of this invention can be added to polymers by any of the conventional procedures, for example by direct addition to the polymer by milling or internal mixing, or by addition to the latex or solution form of the polymer.

The following examples are intended to illustrate but not restrict the practice of the present invention.

Oxygen absorption and tensile retention tests were run. The oxygen absorption tests were conducted by dissolving in benzene portions of an unstabilized SBR polymer (1,006). The benzene contained the antioxidant to be tested at a level of 1.00 part of antioxidant per 100 parts of SBR polymer. The cements so formed were poured onto aluminum foil so as to form a thin film. After drying the weight of rubber was obtained in connection with each sample. Thereafter the foil with the adhering rubber strip was placed in the oxygen absorption apparatus. The time required for each sample to absorb 1.0 percent oxygen was determined and recorded in the following table. This testing procedure is described in further detail in Industrial and Engineering Chemistry, 43, p. 456 (1951) and Industrial and Engineering Chemistry 45, p. 392 (1953).

In addition, tensile retention data was gathered on natural rubber extracted pale crepe gum stock. Aging was done in an oxygen bomb at 70° C. and 300 p.s.i. for 72 hours. After aging tensile retention and weight increase were determined. The natural rubber was vulcanized with approximately five parts of zinc (1951(1953 oxide, three parts of sulfur, one part of hexamethylene tetramine and 1.5 parts of stearic acid along with 1.0 part of the antioxidant to be tested per 100 parts by weight of the natural rubber.

EXAMPLE 1

This example illustrates the preparation of the reaction product of paracresol and bicyclo[2.2.1]heptadiene-2,5. Three hundred twenty-four grams of paracresol and 9 grams of a boron trifluoride/paracresol complex (26 percent boron trifluoride) were heated to 85° C. Ninety-two grams of bicyclo[2.2.1]heptadiene were added dropwise to the mixture at a temperature of from 85° C. to 115° C. over a period of 45 minutes. The mixture was allowed to react for 30 minutes after the complete addition of the bicyclo[2.2.1]heptadiene. The excess paracresol and the boron trifluoride were removed from the mixture by heating the mixture to 185° C. at 50 millimeters of mercury. A residue of 249 grams of a brown brittle resin remained. In the second step 100 grams of the above reaction product along with 100 milliliters of toluene and 4 grams of paratoluene sulfonic acid were charged into a flask and heated to 60° C. Isobutylene was then added until no further reaction occurred. The catalyst was destroyed with aqueous sodium carbonate. The aqueous layer was separated and the volatiles removed by heating the mixture to 190° C. at 25 millimeters mercury. One hundred and eleven grams of a brittle resin remained.

EXAMPLE 2

This example illustrates the preparation of the reaction product of 2-tert-butyl-paracresol and bicyclo[2.2.1]heptadiene2,5. One hundred sixty-four grams of 2-tert.butyl-paracresol and 4 grams of a boron trifluoride/paracresol complex (26 percent boron trifluoride) were heated to 70° C. Forty-six grams of bicyclo [2.2.1]heptadiene-2,5 were added at 70° C. After the reaction was complete the catalyst was destroyed with sodium carbonate. The aqueous layer separated and the volatiles removed by heating the mixture to 140° C. at 15 millimeters of mercury. Two hundred ten grams of a brittle resin remained.

The products of examples 1 and 2 were tested for antioxidant activity by running oxygen absorption tests at 100° C. as described earlier herein. The results are listed below.

| Test | Antioxidant | Hours to Absorb $O_2$ |
| --- | --- | --- |
| A | None | <24 |
| B | Product of example 1 | 310 |
| C | Product of example 2 | 112 |

As the above data indicate, the products of examples 1 and 2 offered antioxidant properties to the SBR-1,006 polymer. The product of example 1 wherein the two step process was used was superior to the product of example 2.

EXAMPLE 3

Three hundred twenty-four grams of paracresol were combined with 10 grams of paracresol-$BF_3$ catalyst. (27.7 percent $BF_3$). The mixture was heated to 80° C. One hundred eight grams of 1,3-cyclooctadiene were added dropwise over a 2 hour period between 80° C. and 100° C. The mixture was stirred for 2 hours longer at 80° C. to 100° C. The unreacted paracresol was distilled out along with the $BF_3$ system up to 170° C. at 11 millimeters of mercury. The weight of product was 234 grams. The molar ratio of bound cyclooctadiene to bound paracresol was 1:1.17. Ninety grams of the above product were dissolved in 100 milliliters of toluene. To this mixture 2 grams of concentrated sulfuric acid were added. The mixture was heated at 60° to 80° C. Isobutylene was added until no more would react. The catalyst was neutralized with aqueous sodium carbonate. The water layer was then separated and the volatiles removed from the mixture by heating the mixture to 190° C. at 20 millimeters of mercury. The weight of the residue was 119 grams.

EXAMPLE 4

Step one of the reaction described in example 3 was repeated substituting 108 grams of 1,5-cyclooctadiene for the 1,3-cyclooctadiene. The product, a resinous material, weighed 215 grams. The ratio of reacted paracresol to reacted 1,5-cyclopentadiene was 1:1. Eighty-six grams of the above product were dissolved in 86 milliliters of toluene. To this mixture was added 1.7 grams of concentrated sulfuric acid. The mixture was heated at 60° to 80° C. Isobutylene was added until no more would react. The catalyst was neutralized with aqueous sodium carbonate. The water layer was separated from the mixture and the volatiles removed by heating the mixture to 190° C. at 20 millimeters of mercury. The weight of the residue was 97 grams.

EXAMPLE 5

Step one of the reaction described in example 3 was repeated substituting 162 grams of 1,5,9-cyclododecatriene for the 1,3-cyclooctadiene. The resinous product weighed 290 grams. The molar ratio of reacted paracresol to reacted 1,5,9-cyclododecatriene was 1.2:1. One hundred grams of the above product were dissolved in 100 milliliters of toluene. To the mixture was added 2.0 grams of sulfuric acid. The mixture was heated to between 60° C. and 80° C. Isobutylene was added until no more would react. The catalyst was then neutralized with aqueous sodium carbonate. The water layer was separated from the mixture and the volatiles removed by heating the mixture to 190° C. at 20 millimeters of mercury. The weight of the residue was 118 grams.

The products of examples 3, 4 and 5 were tested in natural rubber extracted pale crepe gum stock at a level of 1.0 part per 100 parts of rubber. The vulcanized stock was aged in an oxygen bomb at 70° C. and 300 p.s.i. for 72 hours. After aging the percent tensile retention and weight increase were measured. The results are summarized below.

| Test | Antioxidant | % Tensile Retention | % Weight Increase |
| --- | --- | --- | --- |
| D | No antioxidant | 0 | 17+ |
| E | Product of example 3 | 68.7 | 0.302 |
| F | Product of example 4 | 90.5 | 1.67 |
| G | Product of example 5 | 94.8 | 0.326 |

As the above data indicate, the polymer protected with antioxidants of the present invention (tests E, F and G) were stabilized against degradation as indicated by the high-percent tensile retention values and the low-percent weight increase values.

EXAMPLE 6

One hundred sixty-four grams of 2-tert.butyl-paracresol and 4.0 grams of $BF_3$-phenol complex were heated to 80° C. Fifty-four grams of 1,5-cyclooctadiene were added at 80° C. over a two hour period. The catalyst was destroyed with aqueous $Na_2CO_3$. The aqueous layer was separated and the volatiles were removed by heating the reaction mixture to 150° C. at 13 millimeters of mercury. One hundred thirty-three grams of a brittle resin remained. The above product was tested in extracted pale crepe, aged 72 hours at 300 p.s.i. at 70° C. in an oxygen bomb. Results of this test show this material to be a superior antioxidant. Tensile retention data is summarized below.

| Test | Antioxidant | % Tensile Retention |
| --- | --- | --- |
| H | None | 0 |
| I | Product of example 6 | 78 |
| J | 2,6-ditert.butyl-paracresol | 65 |

The above data indicate that the product of example 6 not only offered antioxidant protection, but in addition, was superior to another known phenolic antioxidant.

EXAMPLE 7

In a three-neck 1-liter round bottom flask equipped with stirrer, water condenser, thermometer and drop funnel, 45 grams of bicyclo[3.4.0$^1$ $^5$]7,9 dimethyl nonadiene-2,7 were added in 20 minutes at 90° C. to 100 grams of phenol with 6 grams of $BF_3$-phenol complex catalyst (25 percent $BF_3$). The reaction was allowed to stir 1½ hours at 90° C. and then stripped to pot temperature 190° C. at 25 millimeters pressure to remove excess phenol. The yield was 75 grams. A 1:1.04 molar reaction ratio of diene to phenol was obtained. Sixty-eight grams of the above product, 4 grams of toluene sulfonic acid and 100 milliliters of toluene were added similarly to a 500 milliliter flask. Isobutylene was added until no more would react. The catalyst was destroyed with 6 grams of aqueous $Na_2CO_3$. After decanting the aqueous portion the product was stripped to a pot temperature of 180° C. at 20 milliliters. The yield was 88.5 grams.

EXAMPLE 8

Using the procedure described in example 7, 109 grams of paracresol and 6 grams of $BF_3$-paracresol complex were placed in a one-liter flask. Forty-six grams of bicyclo[3.4.0$^1$·$^5$]-7,9-dimethyl nonadiene-2,7 were added in 17 minutes at 90° C. The reaction was allowed to stir at 90° C. for an additional 1½ hours and then stripped to pot temperature 170° C.

at 15 millimeters pressure. The residue weighed 79 grams. 61.5 grams of the above product 150 milliliters of toluene and 6 grams of toluene sulfonic acid were heated to 60° C. Isobutylene was added until no more would react. The catalyst was destroyed with aqueous Na₂CO₃ and decanted. The product was stripped to pot temperature 185° C. at 28 millimeters pressure. The weight of butylated product was 81.5 grams.

All of the diolefins described herein, both conjugated and unconjugated, will off stabilization in the same manner as the stabilizers for which stabilization test state is included herein.

While certain representative embodiments and details have been shown for the purpose of illustrating the invention it will be apparent to those skilled in this art that various changes and modifications may be made therein without departing from the spirit or scope of the invention.

We claim:

1. A reaction product prepared by (1) reacting a mixture comprising (A) at least one phenol conforming to the following structural formula:

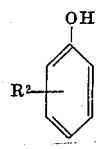

wherein R₂ is selected from the group consisting of hydrogen, alkyl radicals having from one to 12 carbon atoms, cycloalkyl radicals having from five to 12 carbon atoms, aralkyl radicals having from seven to 12 carbon atoms, alkoxy radicals having from one to 12 carbons atoms, cycloalkoxy radicals having from five to 12 carbon atoms and aralkoxy radicals having from seven to 12 carbon atoms and (B) (a) a monocyclic unsaturated hydrocarbon having from seven to 16 carbon atoms within the ring structure, having from two to three nonadjacent carbon to carbon double bonds within the ring structure and having from zero to three alkyl substituents, each alkyl substituent having from one to four carbon atoms or (b) a bicyclic unsaturated hydrocarbon having from five to 12 carbon atoms within the ring structure having two carbon to carbon double bonds within the ring structure and having from zero to three alkyl substituents, each alkyl substituent having from one to four carbon atoms and (2) subsequently reacting the product of the first step with at least one tertiary olefin having from four to 12 carbon atoms, wherein the molar ratio of the diolefin to the phenol is from one to 10 to 10 to one and the reaction between the phenol and diolefin is conducted at a temperature from 25° C. to 160° C. in the presence of a Friedel-Craft-type catalyst and wherein the subsequent reaction with the tertiary olefin is conducted at a temperature between 20° C. and 100° C. in the presence of an acidic catalyst.

2. The reaction product of claim 1 wherein (B) is selected from the group consisting of (a) cyclooctadienes and alkylated cycloocatadienes and (b) compounds conforming to the following structural formulas:

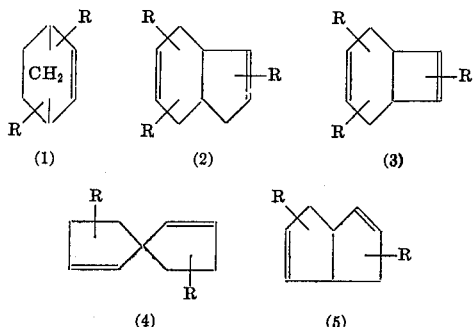

wherein R is selected from the group consisting of hydrogen and alkyl radicals containing one to four carbon atoms.

3. An olefin polymer containing, in an antioxidant amount, the reaction product of claim 1.

4. An olefin polymer containing, in an antioxidant amount, the reaction product of claim 2.

5. The olefin polymer according to claim 3 wherein the phenol is selected from the group consisting of
   phenol
   o,m,p-cresol
   o,m,p-isopropyl phenol
   o,m,p-propyl phenol
   o,m,p-ethyl phenol
   o,m,p-methoxy phenol phenol
   o,m,p-ethoxy phenol
   o,m,p-propoxy phenol
   p-butyl phenol
   p-hexyl phenol
   p-octyl phenol, and phenol, and
   p-dodecyl phenol,
the monocyclic unsaturated hydrocarbon is selected from the group consisting of
   1,4-cycloheptadiene
   2-methyl-cycloheptadiene-1,4
   4-methyl-cycloheptadiene-1,4 1,3-dimethyl-cycloheptadiene-1,4
   1,5-diemthyl-cycloheptadiene-1,4
   1,3cycloheptadiene
   1-methyl- cycloheptadiente-1,3
   3-methyl cycloheptadiene-1,3
   1,4dimethyl-cycloheptadiene1,3
   1,3-cyclooctadiene
   3-methyl-cyclooctadiene 1,3
   b 1,3-dimethyl-cyclooctadiene1,3
   1,4-cyclooctadiene
   5-methyl-cyclooctadiene-1,4
   1,5-diemthyl-cyclooctadiene-1,4
   1,5-cyclooctadiene
   3-methyl-cyclooctadiene1,5
   1,4-diemthyl-cyclooctadiene-1,5
   1,5-cyclododecadiene
   1,7-cyclododecadiene, and
   1,5,9,-cyclododecatriene,
the bicyclic unsaturated hydrocarbon is selected from the group consisting of
   bicyclo[2.2.1]-2,5-heptadiene
   2-methyl bicyclo[2.2.1]-2,5-heptadiene
   3-methyl bicyclo[2.2.1]-2,5-heptadiene
   4methyl bicyclo[2.2.1]-2,5-heptadiene
   2,4dimethyl bicyclo[2.2.1]2,5l-heptadiene
   bicyclo[3.4.0.]nonadiene-2,7
   bicyclo[3.4.0]-7-methyl nonadiene-2,7
   bicyclo3.4.0]-8-methylnonadiene -2,7
   bicyclo[3.4.0]-6-methyl-nonadiene2,7
   [3.4.0]-9-methyl-nonadiene-2,7
   bicyclo[3.4.0]3,8dimethyl nonadiene-2,7
   bicyclo[3.4.0]-3,7dimethyl nonadiene-2,7
   bicyclo[2.4.0]octadiene-2,6
   bicyclo[2.4.0]-5-methyl octadiene-2,6
   bicyclo[2.4.0-6methyl octadiene-2,6
   bicyclo[2.4.0]-7-methyl octadiene-2,6
   bicyclo[2.4.0]-5,7-dimethyl octadiene-2,6
   spiro[4.4]nonadiene-2,6
   spiro[4.4]-6-methyl nonadiene-2,6
   spiro[4.4]-6-methyl nonadiene-2,6
   spiro[4.4]-3,7-dimethyl nonadiene-2,6
   spiro[4.4]-2,6-dimethyl nonadiene-2,6
   bicyclo[3.3.0]octadiene-2,6
   bicyclo[3.3.0]-6-methyl octadiene-2,6
   bicyclo[3.3.0]-7-methyl octadiene-2,6
   bicyclo[3.3.0]-2,5-dimethyl octadiene-2,6and
   bicyclo[3.3.0]-2,6-dimethyl octadiene-2,6
and the tertiary olefin is selected from the group consisting of
   isobutylene
   2-methyl-1-butene
   2-methyl-1-pentene 2-methyl-2-pentene
2-methyl-1-hexene
2-methyl-2-hexene, and
diisobutylene,
and wherein the molar ratio of the diolefin to the phenol is 3:1 to 1:5 and the reaction between the phenol and diolefin is conducted at a temperature between 80° C. and 150° C., wherein the Friedel-Craft-type catalyst is selected from the group consisting of boron trifluroide and complexes based on boron trifluoride and wherein the subsequent reaction with the tertiary olefin is conducted a temperature between 60° C. and 80° C.

6. The olefin polymer according to claim 3 wherein (B) is a bicyclic unsaturated hydrocarbon conforming to the following structural formula

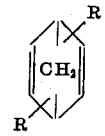

wherein R is selected from the group consisting of hydrogen and alkyl radicals containing 1 to 4 carbon atoms.

* * * * *

UNITED STATES PATENT OFFICE
CERTIFICATE OF CORRECTION

Patent No. 3,625,874      Dated December 7, 1971

Inventor(s) Kirkwood S. Cottman, William S. Hollingshead and Ronald B. Spacht

It is certified that error appears in the above-identified patent and that said Letters Patent are hereby corrected as shown below:

Col. 5, line 23, "in" should read -- is --.
Col. 6, line 39, "(1951(1953" should be omitted.
Col. 7, line 2, after "with" insert -- aqueous --.
Col. 8, line 66, "milliliters" should read -- millimeters --.
Col. 9, line 9, "off" should read -- offer --;
    line 10, "state" should read -- data --.
    line 54, after "acidic" insert -- alkylation --.
Col. 10, line 12, the last "phenol" should be omitted;
    line 17, "and phenol" should be omitted;
    line 23, "1,3-dimethyl-cyclohep" should appear on line 24 with "tadiene-1,4";
    line 25, "diemthyl" should read -- dimethyl --;
    line 35, "diemthyl" should read -- dimethyl --;
    line 38, "diemthyl" should read -- dimethyl --;
    line 32, "b" should be omitted;
    line 48, "2,4dimethyl bicyclo[2.2.1]2,51-heptadiene" should read -- 2,4-dimethyl bicyclo[2.2.1]-2,5-heptadiene --.
Col. 11, line 11, after "conducted" insert -- at --.

Signed and sealed this 1st day of August 1972.

(SEAL)
Attest:

EDWARD M. FLETCHER, JR.      ROBERT GOTTSCHALK
Attesting Officer      Commissioner of Patents